United States Patent

[11] 3,632,282

[72] Inventor Ole-Bendt Rasmussen
28, Rugmarken, Farum, Denmark
[21] Appl. No. 871,305
[22] Filed Dec. 9, 1969
[45] Patented Jan. 4, 1972
[32] Priority June 8, 1965
[33] Great Britain
[31] 24,068/65
Original application June 7, 1966, Ser. No. 555,835, now Patent No. 3,505,162. Divided and this application Dec. 9, 1969, Ser. No. 871,305

[54] APPARATUS FOR PRODUCING FILAMENTARY OR SHEETLIKE MATERIAL OF PLURAL COMPONENTS
10 Claims, 13 Drawing Figs.
[52] U.S. Cl. .................................................... 425/464, 264/75, 264/171
[51] Int. Cl. ...................................................... B29f 3/00, B29f 3/12
[50] Field of Search ........................................... 18/13 D, 13 F, 13 J, 13 K, 13 N, 13 P, 13 R, 13 RR; 264/75, 171, 172, 175

[56] References Cited
UNITED STATES PATENTS
3,511,742 5/1970 Rasmussen .................. 161/109
2,573,050 10/1951 Orsini .......................... 18/13 P X Primary Examiner—J. Spencer Overholser
Assistant Examiner—David S. Safran
Attorney—William J. Daniel ABSTRACT: An extrusion apparatus for producing synthetic sheet material in which a plurality of extrudable synthetic materials are extruded as interspersed streams through alternating groups of extrusion orifices arranged in a row and collected into a coherent assembly within a collecting chamber having an outlet orifice slot therein for removal of the thus formed coherent assembly, combing means being provided to draw out threads of the materials from the interspersed streams thereof on at least certain surfaces of the coherent assembly. Preferably an array of spaced-apart wedge-shaped elements are arranged in gridlike manner between the row of orifices and the collecting chamber and a relative movement generally transverse to the extrusion direction is imparted to such an array in order to subdivide the interspersed streams into thin lamellae of the extrudable materials. One ore more of the edges of such wedge-shaped elements can be serrated in order to draw out threads from the lamellae passing in contact therewith and the relative movement of the array serves to interconnect the thus drawn out threads and bond the lamellae together.

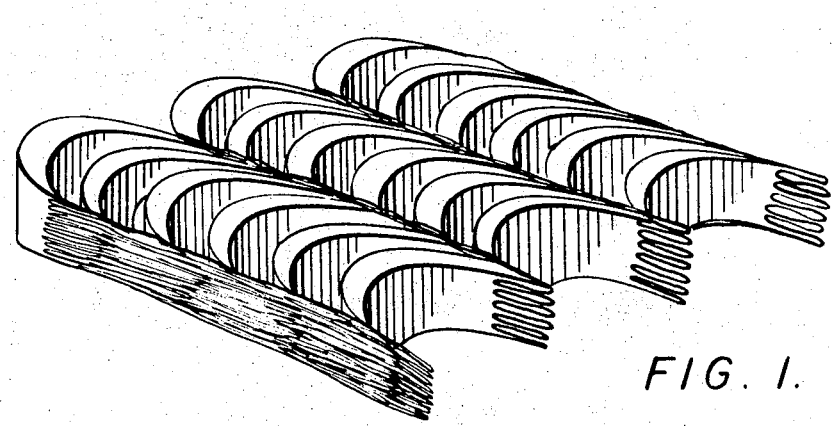
FIG. 1.
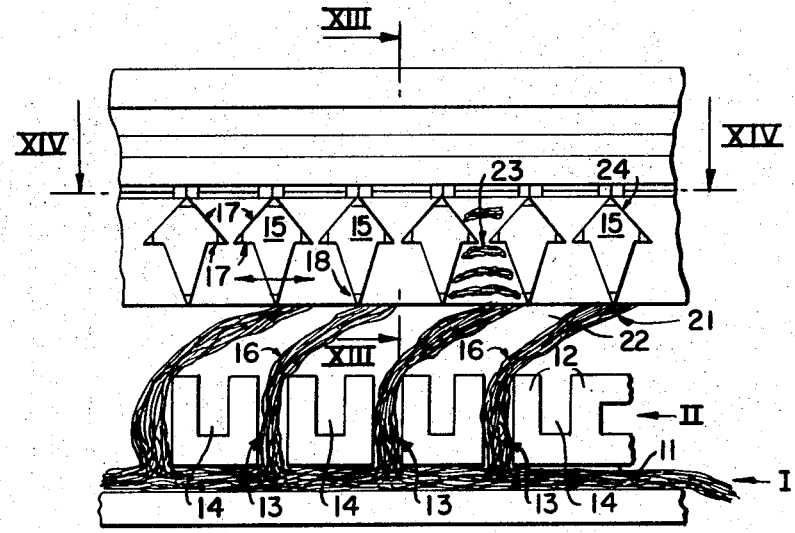
FIG. 2.
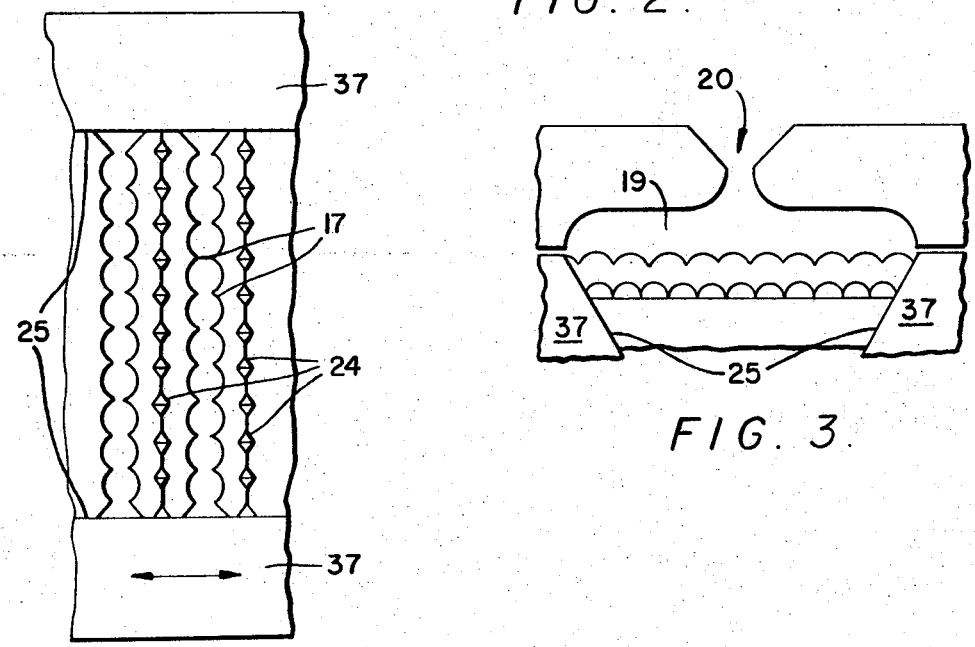
FIG. 3.
FIG. 4.

APPARATUS FOR PRODUCING FILAMENTARY OR SHEETLIKE MATERIAL OF PLURAL COMPONENTS

This application is a division of Ser. No. 555,835, now U.S. Pat. No. 3,505,162, filed June 7, 1966.

In the past it has apparently always been assumed that one can only produce materials having the characteristics necessary of textiles by building these materials up from small elements which are generally fibers or threads. I have now found that it is not necessary to start from these small elements in order to obtain a textile material.

This application is concerned with an extrusion apparatus for producing a class of materials that have a wide variety of uses. The materials according to the invention may be used as textiles, for example as clothing. Other materials may be used as carpeting. Yet other materials may be used as packaging, yet others may be used as building boards while yet others may be leatherlike. The materials according to the invention may be sheetlike or filamentary. If filamentary they may subsequently be formed into any of the products that can be formed from more usual types of filaments.

A filamentary or sheetlike material according to the invention is formed of particles of synthetic polymeric material and each having a spine and a plurality of tentacles which are of the same materials as the spine and are drawn out from the spine and which lie substantially along a flat dimension of the sheetlike material or along the length of the filamentary material, the particles being held together by the tentacles from one particle bonding with adjacent particles.

A convenient method of making the sheetlike or filamentary material according to the invention comprises forming by extrusion fluid or semifluid substantially lamellae-shaped particles of polymeric material separated by a second fluid or semifluid component and arranged in a thin structure, drawing tentacles out from the particles and bonding the tentacles from one particle with other particles to form the shape of the desired filamentary or sheetlike material, setting the polymeric material of the particles and destroying the continuous structure of the second component.

The particles in the filamentary or sheetlike materials according to the invention may have one of a variety of shapes. The tentacles may be drawn out from the sides of the spines of the particles or they may extend from central parts of the spine.

The basic idea behind the invention is the drawing out from particles of synthetic material of tentacles that are subsequently used to bond the filamentary or sheetlike materials together. Depending upon the shape of the initial particles and upon the extent to which tentacles are drawn out from the particles and upon the places on the particles from which the tentacles are drawn out so will the shape of the spine of each particle be determined. Often the spines are lamellae, that is to say the thickness of each is substantially less than either of its other dimensions. However, it often happens that one may draw out from the particles tentacles to such an extent that one can no longer consider the spines as lamellae shaped but they may instead be rod shaped. Thus the spines may have two of their dimensions similar and the third dimension much greater than the other two. Whatever the basic shape of the spines the spines generally will not be arranged linearly in the material. For example, lamellae may be arranged so that they have a saddle shape and rod-shaped spines may be folded back on themselves.

The accompanying drawings serve to assist understanding of the invention. In these drawings:

FIG. 1 is a diagrammatic representation of a typical material produced with an apparatus according to this invention which is made up of parallel rows of saddle-shaped segments;

FIG. 2 is a view of apparatus suitable for making materials according to the invention while FIG. 3 is a section on the line XIII—XIII of FIG. 2 and FIG. 4 is a plan view of part of the apparatus shown on the line XIV—XIV of FIG. 2;

Figure 5:
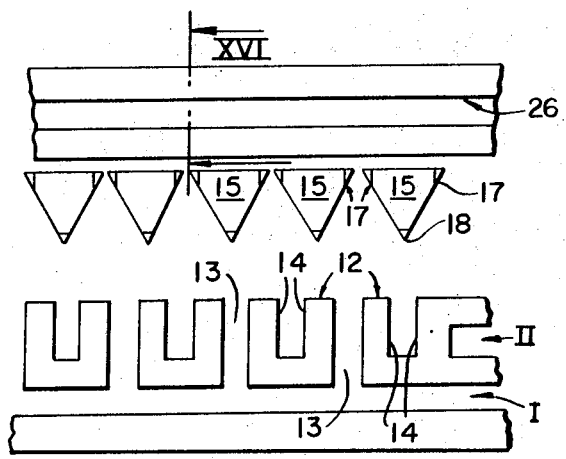
FIG. 5 is a view similar to that of FIG. 2 of a different apparatus and FIG. 6 is a fragmentary section on the line XVI—XVI in FIG. 5 showing only the outlet chamber for that apparatus.

The tentacles drawn out from the spines of the particles of the materials according to the invention are most usually fiberlike, and part of the bonding at least generally results from the felting together of the fiberlike tentacles with one another. However, in addition to this felting, or instead of this felting, there may also be bonding from the use of a suitable bonding agent. This bonding agent or some other material that is present between adjacent particles (i.e. formed or split material as described in more detail below) may also assist in the holding together of the particles. In general, however, the tentacles are always such that the particles can be held together by them, with or without bonding agent, and that any bonding resulting from material between adjacent particles and not associated with the tentacles merely serves to increase the strength of the product still further.

In order that the sheet material shall be held together it is essential that sufficient tentacles be drawn out from each particle. Satisfactory bonding will not occur if there is just one tentacle drawn out from each side of each spine or if just two tentacles extend from central parts of adjacent lamellae-shaped spines. Instead, there must be a plurality of tentacles from each spine, that is to say there must be at least three tentacles from each spine. As is shown in the drawings there are generally many more than this, especially when the tentacles are drawn out from the sides of the spines rather than the centers.

Basic methods and apparatus for extruding fluid or semifluid substantially lamellae-shaped particles of polymeric material separated by a second fluid or semifluid component are known and are described in my copending U.S. Pat. application Ser. No. 391,997, filed Aug. 25, 1964 now U.S. Pat. No. 3,511,742. The basic process generally comprises the use of a body in which there is a row of adjacent parallel ducts and means for supplying one molten material to alternate ducts and a second component to the remaining ducts in the row. The body is so shaped that the extruded material is in the form of a thin structure. In the process and apparatus of the present invention it is generally preferred to extrude the lamellae through a row of ducts as continuous lamellae. The row may be circular and the lamellae, after extrusion, rotated relative to the row in order that the lamellae become arranged helically into a cylindrical sheet. This sheet may then be split along its length to provide a flat sheet. In another method and apparatus the row of orifices is straight and the lamellae-shaped particles are extruded as continuous lamellae in a flat sheet and are then folded back over one another, thereby becoming arranged in zigzag fashion. Whatever the method of extrusion the continuous lamellae may subsequently be cut into short lengths before the tentacles are drawn out from them.

The arrangement of the lamellae after extrusion into the desired pattern in the sheet material is usually effected by subjecting the lamellae to a suitable lateral shear. Thus, they may be extruded through the ducts into a chamber in which they are under pressure from one or more surfaces that move relative to the ducts to provide the desired shear. Thus if the row of ducts to provide the desired shear. Thus if the row of ducts is circular the one or more surfaces may rotate relative to the ducts while if the row is linear then the one or more surfaces may reciprocate relative to the ducts, thus dragging the lamellae into a zigzag pattern.

When the tentacles are to be drawn out from a side of each originally lamellae-shaped particle it is preferred to carry out the drawing in at least two operations. If the particles, even though they are still fluid, are merely dragged against a comb then it is not readily possible to form tentacles that give really satisfactory bonding. Instead, it is preferred to drag the side, or sides, of the lamellae from which the tentacles are to be drawn under pressure against a serrated edge and then to drag the serrated surface so formed under pressure against a knife edge. This knife edge may be straight. The purpose of this second drawing step is to draw a tentacle out from the starting points provided by the first step, and so a comb is not required for the second step. If, as in some constructions, it is preferred or necessary that the edge used for the second drawing step should be serrated it should be constructed and used in such a manner that as far as possible the parts of the serrated surface to be drawn should come in contact with convex parts of the edge rather than concave. By carrying out the tentacle drawing in two stages more uniform tentacles and tentacles of greater length are obtained. The initial drawing against the serrated edge provides a serrated surface and the tentacles are subsequently drawn out from the ridges of this surface.

A suitable apparatus for carrying out the process of the invention is shown in FIGS 2 to 4 of the accompanying drawings. To the composite sheet-extruding device the two melted polymers designated I and II are supplied by means of two feeder extruders (not shown). I is used to form the segments of the fabric and II is the second component. In the drawing I is marked with shading lines, whereas II is not marked. From the extruders, I and II are pressed into the device through main channels and subsequently divided out on a series of very narrow ducts 13 and 14 separated by walls 12. Walls 12 separate ducts 13, through which the polymeric material I is extruded, from ducts 14 through which the second component II is extruded. The main channel for supplying polymer I to ducts 13 is seen at II and a similar channel (not seen) communicates with ducts 14 for supplying the second component II to ducts 14. The ducts 13 and 14 are shown here in simplified form, but are shown in greater detail in FIG. 9. There is an array of similar wedges 15 spaced downstream from the orifices 16 of the ducts, each being arranged with a corner edge 18 directed towards the orifices and the other two corner edges, 17, adjacent other wedges, being serrated. The whole assembly is within a narrow body, defined by walls 37, (see FIG. 4) and this body also includes a necked down outlet chamber 19 for receiving material extruded through the orifices and which has passed through the array of wedges, the chamber 19 facing towards the wedges and having an elongated outlet slot 20 spanning the length of the row of orifices relative to the orifices. The array of wedges is adapted to be given motion relative to the arrangement of orifices in a direction transverse to the general direction by means not shown. They may result either in relative rotation or in relative reciprocation. Either the array of the wedges or the ducts, or both, may be moved. The shear exerted by the edge 18 results in streams 21 of polymer I and streams 22 of second component II being dragged across the top of the orifices. When the wedges reciprocate, the streams 21 and 22 are dragged back and forth. As further material is forced out through the ducts 13 and 14 the streams are gradually forced up into contact with the edges 18 of the wedges and are chopped into short segments 23 by these edges. In order to assist in the dragging and chopping, or tearing, of the streams the edges 18 are preferably finely serrated. The teeth on the edges 18 may be, for example, 0.2 mm. apart. Preferably the distance between the edges 18 and the orifices 16 is greater than the distance between two adjacent ducts 13 but is preferably less than the width of each duct 13. When the wedges are reciprocating the amplitude of the reciprocations should be many times greater than the distance between two adjacent ducts 13. The duration of half a reciprocation should preferably be about the same as the time taken for material extruded from an orifice 16 to reach the edge 18. The edges 17 are coarsely serrated and there may be, for example, about 1 millimeter between adjacent teeth.

The segments 23, some of which are shown in FIG. 2, are forced up through the passage between adjacent wedges 15. This passage is of gradually decreasing width up to a restriction formed by opposed overhanging shoulders, at which the passage width is substantially less than elsewhere along the length of the passage. In the apparatus illustrated the ends of both shoulders are defined by serrated edges 17, but if tentacles are only to be drawn out from one side it is sufficient for one side only to be serrated. The segments 23 are then forced up further, past the neck, and are then drawn under pressure against a reciprocating comb provided by the upper edge 24 of the wedges 15. This comb serves not only to draw out further the tentacles, the drawing of which was started by the serrated edges 17, but also to felt together the tentacles that are drawn out. The comb 24 reciprocates and so the segments are arranged in a zigzag manner in parallel rows, the segments in each row being in end-to-end relationship. The comb 24 is preferably arranged so that the ridges formed on the lamellae by contact with the serrated edge 17 come into contact with the ridges of the comb 24, rather than with the recesses. Thus the ridges should be about 1 millimeter apart.

The segments 23 drag against the edge surfaces along either side of the passage formed between the two adjacent wedges 15 and so become saddle shaped, as seen in FIG. 1. If they drag also against the ends 25 of the passage between adjacent wedges as defined by walls 37, then they will become cup shaped. In order to reduce this tendency, the length of the passage, as defined by the ends 25, is preferably increased or expanded gradually towards the neck 17, and also further, up to the comb 24. The reduction in width of the passage between each wedge up to the restriction not only ensures that the segments engage with the edge 17 under pressure, but also produces a hang-up of material.

Upon passage through the chamber 19 and outlet 20 the segments 23, which by then have been felted together into rows, are forced into closer contact with one another and the bonding of the whole together is improved. In addition to moving the wedges or the ducts, both may move, or the chamber wall may move, or all three may move.

The orifices 16 may be, for example, from 3 mm. to 2 cm. generally about 8 mm. long, viewed as in FIG. 3 and may be, for example, about 0.3 mm. wide, viewed from FIG. 2. If the outlet 20 is suitably dimensioned with respect to the width of the chamber 19 at the combs 24 then the segments are turned through 90° during their passage through this chamber. The outlet must be substantially narrower than the length of the segments, viewed in the direction of FIG. 3, for this to occur. A knife edge may be provided in the outlet with the result that the serrated surface or surfaces of the segments, resulting from contact with the comb 17, are dragged under pressure against this knife edge, tentacles thus being drawn out. In general, for a substantial number of the segments to be turned round, the outlet 20, viewed as in FIG. 3, should have a width of from one-third to one-fourth of the width of the widest part of the chamber 19. In practice generally some of the segments will be turned round and others will not, some felting together resulting from the action of the edge 24 and some from a knife edge in the outlet 20.

Figure 6:
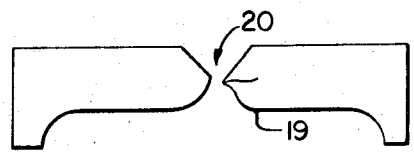

The apparatus shown in FIGS. 5 and 6 is similar to that shown in FIGS. 3 to 4 except that the upper edges 24 of the wedges 15 is missing. This apparatus is intended primarily for processes in which the dimensions of the outlet 20 are such that the segments are turned through 90° as they pass through and out of the chamber 19 and accordingly the outlet 20 is provided with a knife edge 26 to serve to draw out the tentacles.

Figure 11:
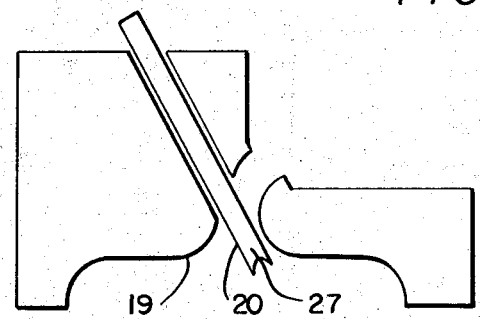
FIG. 11 is a modification of the apparatus shown in FIG. 6.

The apparatus shown in FIG. 11 is a modification of that shown in FIG. 6 as in this a barbed needle 27 is fitted to reciprocate within the outlet 20 so as to needle segments together as they pass through the outlet. The needle 27 is described in more detail below. This needle may have in addition to its stitching movement a rotary movement to produce twist of the tentacles. The stitching movement is rapid and preferably at times when the lateral movement of the fluid mass is comparatively slow. A similar needle arrangement may be provided in the outlet 20 shown in FIG. 3. It will be appreciated that the needle punching results in tentacles being carried from one lamellae particle through needle-punched holes in adjacent particles.

Figure 8:
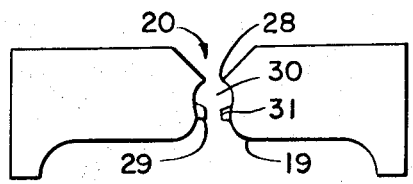
FIG. 8 is a fragmentary section on the line XVIII—XVIII of FIG. 7 showing the outlet chamber for the apparatus of FIG. 7.
Figure 7:
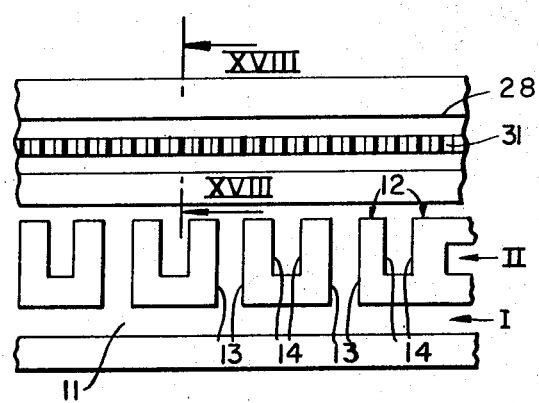
FIG. 7 is a view similar to that of FIG. 12 of yet another apparatus.
Figure 13:
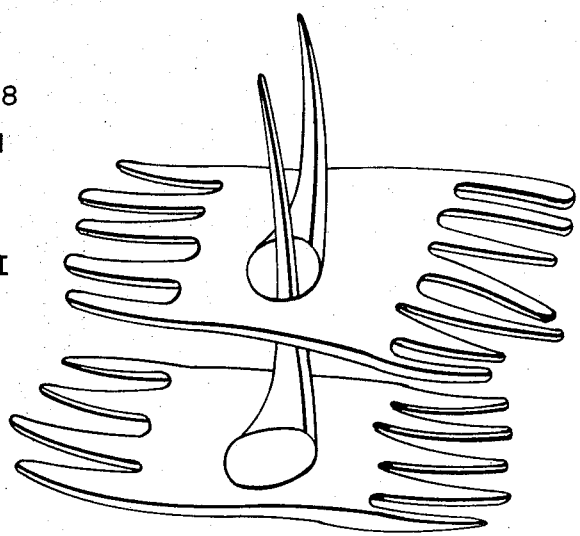
FIG. 13 is a diagrammatic representation of a product including tentacles extending from central parts of lamellae and made by modified forms of apparatus embodying features shown in FIGS. 9 and 11.

In FIGS. 7 and 8 there is shown apparatus suitable for use in a process in which the lamellae are not cut into short segments. In this apparatus the wedges are omitted and the body comprises the ducts and necked-down outlet chamber 19 directed towards the orifices of the ducts and having an elongated outlet slot 20 spanning the length of the row of ducts as before. The apparatus also includes means for moving the necked-down outlet chamber 19 along the row of orifices relative to the orifices. To initiate the drawing out of the tentacles there is a serrated edge 31 at the entrance to the outlet 20 and a straight knife edge 28 at the exit to the outlet by the edge 31. There may also be edges 31 and 28 on the opposite side of the outlet. The edge 31 is preferably set in a channel 29 in order that turbulence shall be at a minimum when the tentacles are drawn out. Again, there is preferably a pocket 30 between the edges 31 and 28, again to produce a hang-up of material. Instead of drawing tentacles out by contact with the edges 31 and 28, or in addition to this, the continuous lamellae may be needled together by needles reciprocating up and down through the ducts.

Figure 9:
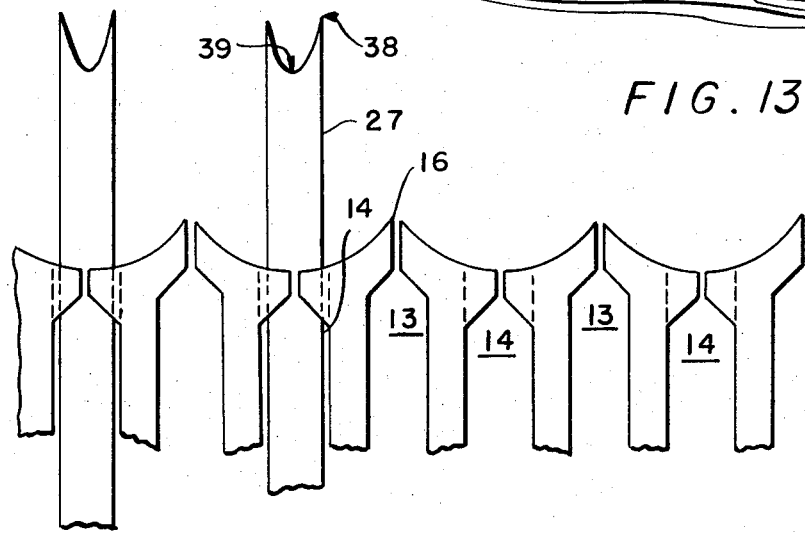
FIG. 9 is a section through an arrangement of ducts suitable for extruding the polymeric material and second component in the method of the invention.
Figure 10:
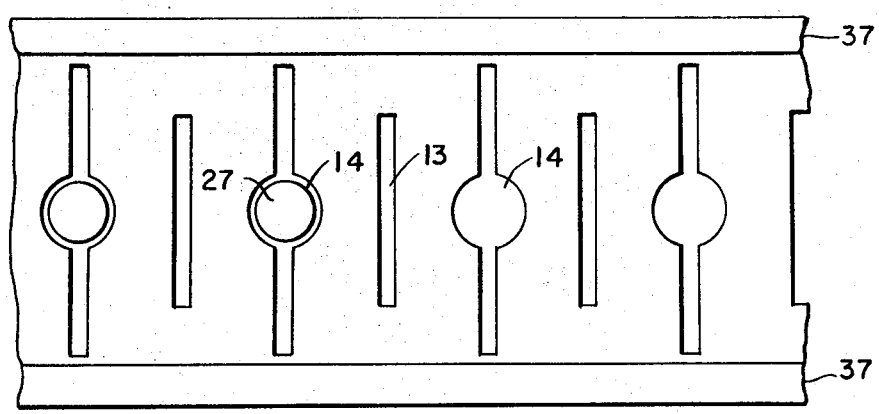
FIG. 10 is a plan from above on the ducts shown in FIG. 9.

A Preferred arrangement of ducts is shown in FIGS. 9 and 10. Needles are shown only in one side. The orifices 16 of the ducts 13 from which the polymeric material of which the particles are to be composed is extruded are preferably raised above the orifices 16 of the ducts 14, from which the second component is extruded. As a result of this the carrying of the polymer streams extruded from the ducts 13 over the ducts 14 is facilitated. Preferably the orifices 16 both of ducts 13 and 14 are narrower than the main parts of the ducts. Preferably the ducts 14 are a little longer, when viewed from above, as in FIG. 10, than are the ducts 13. The advantage of this is that the second component flows over the walls 37 of the body defining the whole apparatus and which encloses the polymer streams extruded from the ducts, and so acts as a lubricant between the polymer streams extruded from the ducts 13 and the walls. Preferably the distance apart of the ducts 13 is less than their width, as viewed from above. If a needle is to reciprocate through the ducts then it is preferably arranged within the ducts 14, as shown. The needles 27 generally have sharp leading edges 38 to punch holes and rounded trailing edges 39 to draw the tentacles out. Preferably the needles rotate in order to produce a twist of tentacles. The stitching carried out rapidly and preferably at times when the lateral movement of the mass is comparatively slight.

It is preferred that the component from which the particles are to be formed should have a higher melt viscosity than the second component. This has the advantage that the second component serves as a particularly satisfactory lubricant and also it facilitates the chopping and shaping of the particles of the polymer, since they are the more viscous. As an example, the polymeric material of which the particles are to be formed preferably has a melt viscosity of from 3 to 30 times the melt viscosity of the second component.

Figure 12:
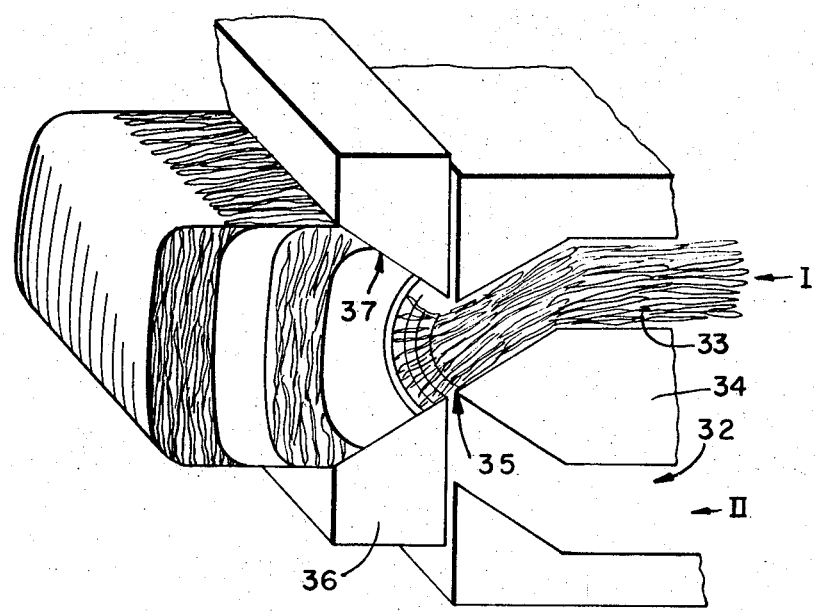
FIG. 12 is a section through apparatus suitable for making filaments or sheet materials.

In FIG. 12 there is shown an apparatus suitable for making sheet or filamentary material. It comprises a body including a pair of ducts 32 and 33 separated by a wall 34 having a serrated leading edge 35. There is a gate 36 slidable over the orifices of the ducts to open one orifice while closing the other. There are means (not shown) for reciprocating the gate over the orifices and means for supplying one polymeric material to duct 33 and the other component to duct 32. Thus, in this apparatus pulses of the polymeric material and the second component alternate with one another and a product is formed consisting of a single row of the pulses. By appropriately choosing the rate of extrusion and the rate of reciprocation of the gate, pulses of any desired shape may be formed. Generally they will be substantially lamellae shaped. If the ducts and gate are short or circular then a filament is formed. As a result of the gate sliding over the serrated edge tentacles 37 are drawn out from the polymeric material by the sliding of the gate. In this apparatus the viscosity of the two fluid components may be similar or they may be different.

This method of reciprocating a gate over ducts may be applied to the production of sheetlike materials made up of a number of rows of segments. Thus, the polymeric material may be fed through a number of polymer ducts arranged in a row while feeding the second component through component ducts, repeatedly closing the polymer ducts while opening the component ducts and vice versa, thereby forming a sheet comprising parallel rows of saddle-shaped segments of the polymeric materials separated from one another by the second component, combing the edges of the segments and entangling the tentacles of adjacent segments together, setting the polymeric material of the segments and removing or splitting into fibers the second component. The opening and closing of the ducts may be effected by reciprocation of a series of triangular wedges, moving with their bases over the orifices to the ducts, and having a comb cut into their upper edge so as to serve to comb the edges of adjacent rows and entangle the tentacles thus drawn out together.

Both the polymeric material and the other component extruded with the polymeric material must be fluid or semifluid in order that they are extrudable. It is generally preferred that the polymeric material of which the particles are formed should be of quite a soft polymer in order to improve the properties of the final product, textile properties and the tear resistance at the junction of the tentacles with the spine being improved in particular. Suitable polymeric materials are polyamides, polyesters, polyurethanes, polypropylene, polyethylene, and other crystalline polyolefines, polyvinyl chloride, generally slightly plasticized, and extrudable copolymers of polvinylidene chloride, high-impact-strength modified polystyrene, and polycarbonates. Particularly preferred polymers are the polyamides known as nylon. The polymers may be extruded as prepolymers and subsequently polymerized during the process.

The second component must be one whose continuous structure can be destroyed when desired. It can be of the same type of polymer as the polymeric material of which the particles are formed but of different molecular weight or it can be of a different polymeric material. It can be a paste free of any polymeric material being, for example, a mixture of a lubricant and a thickening agent. It is particularly preferred to use as all or part of the second component a polyoxyethylene resin, as this is water soluble and can readily be removed by washing with water. Mixtures of the polymeric material of which the particles are formed and another polymeric material or other material may be used as the second component.

For further details as to the materials employed in the apparatus of the invention, reference may be had to U.S. Pat. No. 3,505,162 covering the products of this invention.

I claim:

1. An apparatus for the manufacture of a synthetic sheet material by extrusion comprising a multiplicity of extrusion orifices arranged in a row, means for supplying a first extrudable material to first set of said orifices, means for supplying a second extrudable material to a second set of said orifices alternating with the first set of orifices, a collecting chamber for combining interspersed streams of said materials extruded through said orifices into a coherent assembly of a multiplicity of lamellae extending through a substantial extent of the thickness of said assembly, said collecting chamber including an outlet slot generally coextensive in length with said row of orifices for removing said coherent assembly from said chamber, and combing means contacting the extrudable materials after extrusion from said orifices but before removal of the coherent assembly from the chamber for drawing out threads from said lamellae to bond said lamellae together.

2. The apparatus of claim 1 including an array of wedge-shaped elements disposed in spaced-apart relation generally transversely of the extrusion direction intermediate said row of orifices and said collecting chamber with the apexes of said elements lying nearest said orifices, each of said wedge-shaped elements having at least one edge thereof serrated to act as said combing means.

3. The apparatus of claim 2 wherein the apex of each wedge-shaped element is serrated.

4. The apparatus of claim 2 wherein the mutually facing edges of each adjacent pair of said wedge-shaped elements are serrated.

5. The apparatus of claim 2 wherein said wedge-shaped elements are diamond- or double-wedge-shaped and the edges thereof remote from said orifices is serrated.

6. The apparatus of claim 2 wherein said array of wedge-shaped elements is mounted for movement in a direction generally transverse of the extrusion direction relative to said row of extrusion orifices and said collecting chamber and including means for imparting relative movement to said array in said transverse direction.

7. The apparatus of claim 1 wherein said collecting chamber includes on at least one side thereof a row of teeth adjacent and parallel to the outlet slot therefrom.

8. The apparatus of claim 7 wherein said outlet slot is formed with a restriction therein downstream of said row of teeth.

9. The apparatus of claim 7 wherein said collecting chamber is mounted for movement in a direction generally transverse of the extrusion direction relative to the row of extrusion orifices and including means for imparting said relative movement to said collecting chamber in said transverse direction.

10. The apparatus of claim 1 including a row of closely spaced reciprocable needles arranged generally parallel to the row of orifices and adapted to penetrate said interspersed streams of extrudable materials in a direction generally parallel to the extrusion direction and means for reciprocating said needles.

* * * * *